United States Patent [19]
Koepke et al.

[11] Patent Number: 5,584,154
[45] Date of Patent: Dec. 17, 1996

[54] CLOSURE AND SEALING JOINT FOR INCORPORATION IN SUCH A CLOSURE

[75] Inventors: John E. Koepke, Eldorado; Charles R. Jackson, Oshkosh, both of Wis.

[73] Assignee: Morgan Products Ltd., Oshkosh, Wis.

[21] Appl. No.: 252,911

[22] Filed: Jun. 2, 1994

[51] Int. Cl.⁶ .................................................. E06B 3/74
[52] U.S. Cl. .......................... 52/456; 52/425; 52/457; 52/656.2; 52/656.4; 52/656.9; 52/741.4; 52/745.19; 52/775; 49/501; 403/288; 403/375
[58] Field of Search .............................. 52/455, 456, 457, 52/458, 775, 656.9, 656.4, 656.2, 656.5, 656.1, 784.1; 403/288, 375, 179, 404, 231, 264, 403, 402, 404; 49/479.1, 501

[56] References Cited

U.S. PATENT DOCUMENTS

| | | |
|---|---|---|
| 3,845,604 | 11/1974 | Ottosson . |
| 3,880,535 | 4/1975 | Durham et al. . |
| 4,240,764 | 12/1980 | Wegner . |
| 4,336,678 | 6/1982 | Peters . |
| 4,564,306 | 1/1986 | Rock et al. . |
| 4,797,020 | 1/1989 | Winston . |
| 4,870,797 | 10/1989 | Hagemeyer ................... 52/455 |
| 5,028,165 | 7/1991 | Schools ...................... 403/403 X |
| 5,050,359 | 9/1991 | Lorge et al. . |
| 5,148,649 | 9/1992 | Cipriano ..................... 403/403 X |

FOREIGN PATENT DOCUMENTS 287018  3/1928  United Kingdom ..................... 52/456

*Primary Examiner*—Christopher T. Kent
*Attorney, Agent, or Firm*—Foley & Lardner

[57] ABSTRACT

A closure, such as a door or window unit, and a joint for such a closure are provided. The closure has an inside and an outside, and includes a plurality of first frame members alternately joined to a plurality of second frame members to form a planar frame, and a panel member is positioned within the frame. The joint, formed at each location where a first frame member abuts a second frame member, includes an end area of a first frame member, a mating area of a second frame member and a sealing member. The sealing member is disposed at the interface defined between the end area and the mating area to establish a weather-resistant barrier between the inside and the outside of the closure. A method for fabricating a closure is also provided.

20 Claims, 2 Drawing Sheets

CLOSURE AND SEALING JOINT FOR INCORPORATION IN SUCH A CLOSURE

BACKGROUND OF THE INVENTION

The present invention relates generally to closures, such as doors or windows, and to sealing joints for such closures. More particularly, the invention relates to a sealed joint establishing a weather-tight barrier for closures, to a closure incorporating such sealed joints, and to a method for fabricating a closure of this type.

Exterior closures, such as doors and windows, must generally provide a tight barrier between the outside and the inside of the structure in which they are used. In recent years concern with energy efficiency has intensified the drive toward reliable sealed closures with good heat transfer characteristics. Such closures improve comfort in the interior, climate-controlled living or working space, and contribute to reducing energy usage and thermal losses.

A substantial number of sealing arrangements have been proposed, particularly for sealing around window pane assemblies and between closures and their associated frames. One such arrangement is described in U.S. Pat. No. 5,050,359 issued on Sep. 24, 1991 to Lorge et al. and assigned to the owner of the present invention, Morgan Products Ltd. While such advancements have provided greatly improved energy efficiency, they have not addressed all of the potential sources of leakage through exterior closures, particularly closures comprising an assemblage of multiple elements.

In common multiple-element closures, structural parts such as stiles and rails generally meet to form an outer frame that is structurally secured by such affixing agents as gluing, tacking, or both. A panel, or a number of panels, may be held between the sties and rails by similar means. Most six-panel doors, so-called French doors, and window assemblies are generally constructed in this way. Because the panels, and the joints between the panels in such closures constitute the greatest potential for leakage, improvements in sealing these closures have tended to concentrate on sealing at these locations, while the outer frame has been treated as a solid barrier not requiring additional sealing arrangements.

It has been found, however, that joints between structural elements such as sties and rails can also lead to leakage through the closure. Even where these joints are apparently tightly glued and otherwise tightly affixed, circuitous leak paths are defined between the structural elements that permit air or moisture to penetrate through the frame. The potential for entry of air and moisture is greatly exacerbated by the use of nails, tacks or staples to secure the structural elements. In addition to reducing the efficiency of the closure, over time the intrusion of air and moisture into the frame can result in degradation of the joints and may eventually degrade the entire closure. Where affixing means such as nails, tacks or staples are used to secure the various elements of a composite door additional manufacturing steps are generally required, including covering the affixing means with a cosmetic putty and sanding the putty smooth. Moreover, on good quality wooden closures, even where such putty closely matches the color of the wood, the end result is rarely as aesthetically pleasing as an "all-wood" product.

The present invention is directed to overcoming or minimizing the shortcomings of existing closures in sealingly separating the interior from the exterior of a dwelling or other structure. In particular, the invention is directed to a joint for a closure wherein a sealing member is interposed at the interface between the closure's structural frame members to form a weather-resistant barrier between the inside and the outside of the closure. The invention is also directed to a sealed closure incorporating such joints and to a method for fabricating a closure that results in a unified structure without the use of nails, tacks or staples.

SUMMARY OF THE INVENTION

In accordance with one aspect of the invention, there is provided a joint for a closure. The closure has an inside and an outside and includes a first member and a second member. The first member has an end area extending intermediate the inside and the outside, and the second member has a mating area suitably configured to conformingly abut the end area to define an interface and to establish a via intermediate the inside and the outside. The joint comprises the end area of the first member, the mating area of the second member and a sealing member. The sealing member at least partially covers the interface to block the via and to establish a weather-tight barrier at the interface.

In accordance with another aspect of the invention a sealed closure is provided. The closure has an inside and an outside and comprises a plurality of first frame members, a plurality of second frame members, a plurality of sealing members and a panel member.

The first frame members and the second frame members meet at a plurality of joints to define a substantially planar frame presenting a central aperture. The panel member is peripherally and sealingly retained in the central aperture by the first and second frame members. At each joint between a first frame member and a second frame member a first frame member conformingly abuts a second frame member to define an interface and to establish a via intermediate the inside and the outside. Also at each joint a sealing member at least partially covers the interface to block the via and to establish a weather-tight barrier at the interface.

In accordance with a further aspect of the invention, there is provided a method for fabricating a closure. The method includes the steps of positioning a plurality of first frame members and a plurality of second frame members alternately to define a substantially planar frame having a central aperture, and positioning a panel member within the aperture. The method includes the further steps of urging the first frame members and the second frame members toward one another to engage the panel member and to establish a plurality of joints, and compressively abutting the first frame members and the second frame members to establish a unified structure.

It is, therefore, an object of the present invention to provide a joint for a closure that effectively prevents the intrusion of air and moisture through the closure, thereby enhancing the efficiency and extending the life of the closure.

A further object of the present invention is to provide a closure and a sealing joint for incorporation in such closures that afford the advantage providing a weather-resistant barrier in a strong, unified structure without the use of nails, tacks or staples penetrating into the closure.

A further object of the present invention is to provide a method for fabricating closures that is relatively simple and results in a strong, attractive product without the use of nails, tacks or staples.

Further objects and features of the present invention will be apparent from the following specification and claims when considered in connection with the accompanying drawings illustrating the preferred embodiment of the invention.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
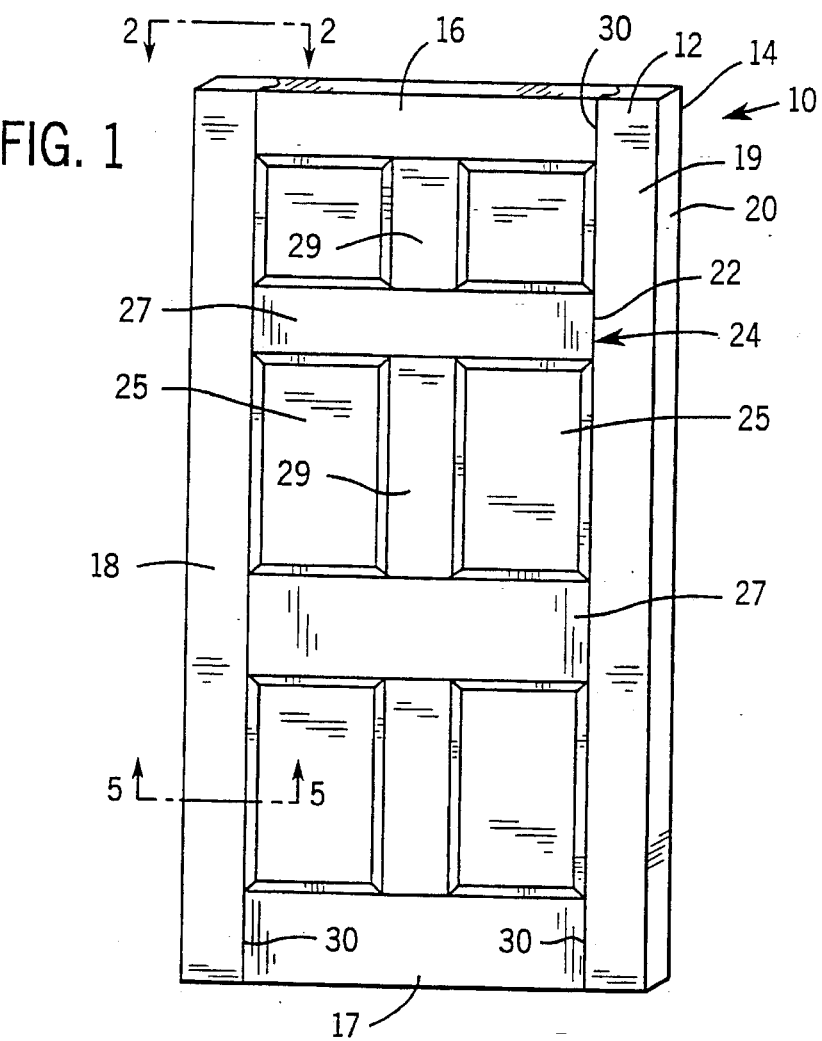
FIG. 1 is a perspective view of a panel door in accordance with the invention.

FIG. 1 is a perspective view of a panel door in accordance with the invention. In FIG. 1, a closure 10 has an inside 12 and an outside 14. Closure 10 may be a door, such as a panel door as illustrated in FIG. 1, or a French door or window unit of similar construction. Moreover, while closure 10 as illustrated and discussed in the present disclosure has a generally rectangular configuration, it should be understood that closure 10 may have other shapes such as octagonal or round, particularly where closure 10 is a window unit. Closure 10 comprises a plurality of first frame members, such as an upper rail 16 and a lower rail 17, alternately fitted to a plurality of second frame members, such as stiles 18, 19 to form a substantially planar frame 20 presenting a central aperture 22. A panel member 24 is peripherally retained in central aperture 22, and may include panels 25 of equal or various size, intermediate rails 27, and mullions 29 arranged in a grid or matrix to form panel member 24. At each location in closure 10 where a first frame member 16, 17 meets a second frame member 18, 19, a joint 30 is established as will be described.

Figure 2:
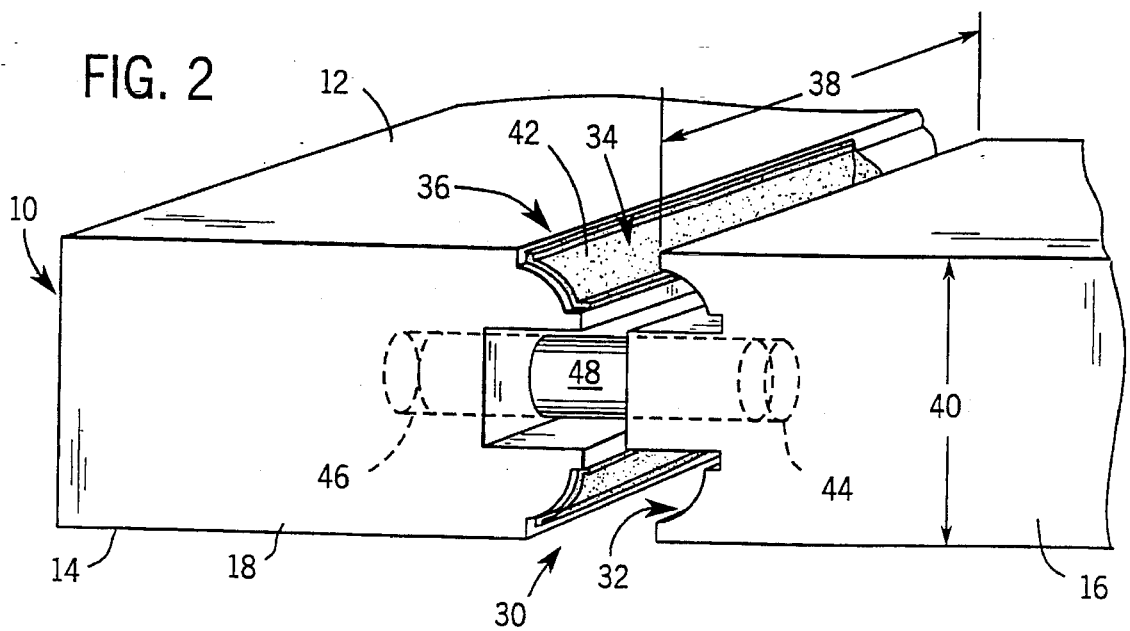
FIG. 2 is an exploded perspective view of a portion of the top corner of the door illustrated in FIG. 1 viewed along section 2—2, showing the cooperation of the profiled edge of a vertical stile and the profiled end of a horizontal rail.

FIG. 2 is an exploded perspective view of a portion of the top corner of the door illustrated in FIG. 1 viewed along section 2—2, showing the cooperation of the profiled edge of a vertical stile and the profiled end of a horizontal rail. In FIG. 2, a first frame member, such as upper rail 16, includes an end area 32 extending intermediate the inside 12 and outside 14 of closure 10. Similarly, a second frame member, such as stile 18, has a mating area 34 intermediate inside 12 and outside 14. End area 32 is configured to conformingly abut mating area 34 at each joint 30 to define an interface or boundary area 36 intermediate inside 12 and outside 14. Interface 36 extends over the entire end area 32 and mating area 34, having a height 38 equal to the height of areas 32 and 34, and a width 40 equal to the width of areas 32 and 34 (essentially equal to the thickness of closure 10 at the location of joint 30). While the structural members of closure 10, such as rail 16 and stile 18 effectively establish a weather-resistant barrier between inside 12 and outside 14, each interface 36 establishes a via or leakpath through which air or moisture can potentially penetrate. To block the via at interface 36, a sealing member 42 is disposed at interface 36 intermediate inside 12 and outside 14 as will be discussed below.

Each first frame member, such as upper rail 16, is preferably adhesively joined to the adjacent second frame members, such as stile 18. While the conforming abutment of end area 32 to mating area 34 affords excellent rigidity, in the presently preferred embodiment each first frame member 16 is provided with a bore 44 traversing end area 32, and each second frame member 18 has a similar bore 46 traversing the mating area 34. Bores 44 and 46 are located on the respective frame members 16, 18 so as to lie in mutually facing relation substantially in register when the frame members 16, 18 are positioned and assembled to form joint 30. A connecting member 48, such as a hardwood dowel, is positioned intermediate bores 44 and 46, and penetrates into both bores to secure joint 30. In a similar manner, depending upon the size and weight of closure 10, two or more such dowel arrangements could be provided at each joint 30. It has been found that the foregoing arrangement of each joint 30 procures the significant advantage of providing a strong, unified structure without requiring additional elements, such as nails, tacks or staples, on either side of closure 10 that could otherwise compromise the thermal efficiency and, over time, compromise the structural integrity of closure 10.

Figure 3:
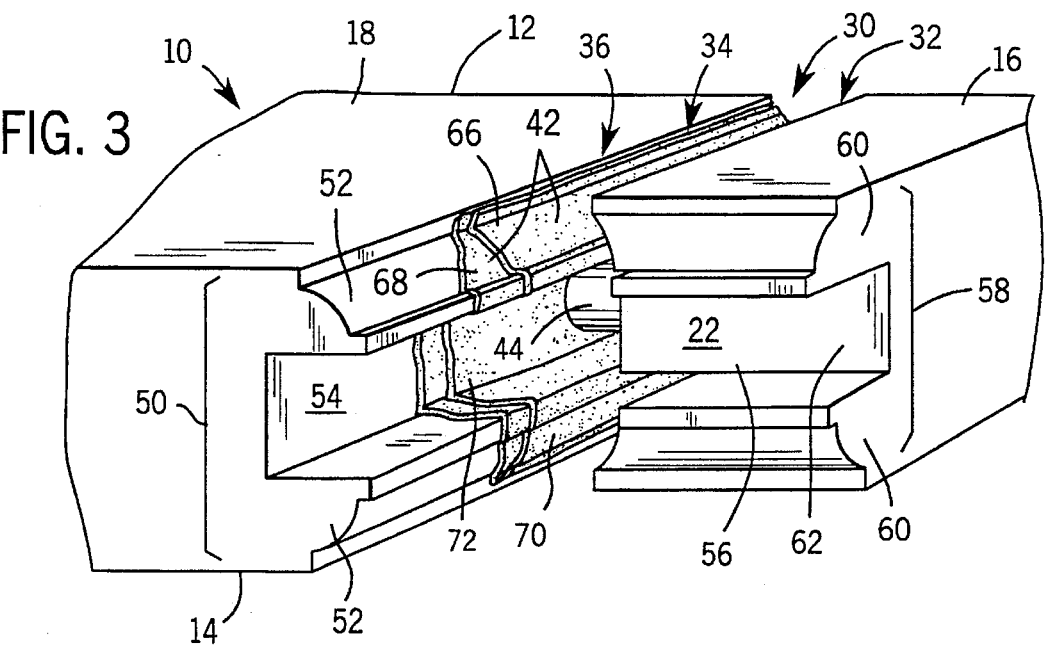
FIG. 3 is an exploded perspective view of an inside corner of the door illustrated in FIG. 1 with the panel removed and the frame disassembled to show the position of the various portions of the sealing member in accordance with the preferred embodiment of the invention.

FIG. 3 is an exploded perspective view of an inside corner of the door illustrated in FIG. 1 with the panel removed and the frame disassembled to show the position of the various portions of the sealing member in accordance with the preferred embodiment of the invention. In FIG. 3, a second frame member, such as stile 18, has a profiled edge 50. Profiled edge 50 includes an integral cope 52 and a central groove 54. In the preferred embodiment shown in FIG. 3, integral cope 52 is provided on both the inside 12 and the outside 14 of closure 10. Profiled edge 50 may be formed by routing, milling or similar known techniques. End area 32 of each first frame member, such as rail 16 is provided with a complementary profile such that end area 32 may abut and conform to the contour of profiled edge 50 of a second frame member 16. In particular, end area 32 includes a central protrusion 56 located and dimensioned to enter into central groove 54 of profiled edge 50 in the assembled closure 10. Because profiled edge 50 extends over the entire length of the second frame member 18, profiled edge 50 serves the dual purpose of providing mating area 34 suitably configured to conformingly abut end area 32 of a first frame member 16 at interface 36, and facilitating insertion and retention of panel member 24 in aperture 22 as will be described. For the latter purpose, each first frame member 16 is provided with a profiled edge 58 similar to profiled edge 50 of second frame member 18, including integral copes 60 and a central groove 62.

As shown in FIG. 3, at each joint 30 sealing member 42 is disposed at interface 36 intermediate inside 12 and outside 14 of closure 10. While conventional closures may include glue between stiles and rails, it has been found that glue alone does not effectively block the via established at interface 36 through closure 10. To provide such a barrier, sealing member 42 of the present closure 10 at least partially spans interface 36, blocking all potential leakpaths between first frame member 16 and second frame member 18. In the presently preferred embodiment, sealing member 42 is an adhesive foam tape which is both easy to apply and requires little or no cleanup. While sealing member 42 may be substantially coextensive with interface 36, sealing member 42 is conveniently divided into a first portion 66 that substantially spans the height 38 of interface 36 (FIG. 2) adjacent to the inside 12 of closure 10, and a second portion 68 that abuts first portion 66 and substantially spans the width 40 of interface 36 (FIG. 2). The combination of first portion 66 and second portion 68 of sealing member 42 provides a complete barrier between inside 12 and outside 14. In the preferred embodiment, sealing member 42 includes a third portion 70 that abuts second portion 68 and substantially spans the height 38 of interface 36 (FIG. 2) adjacent to the outside 14 of closure 10. This arrangement effectively prevents the entry of air and moisture through joint 30 from inside 12 or outside 14, and provides the added advantage of forming a region 70 that acts as an adhesive retention reservoir during the assembly of closure 10. Because the assembly of closure 10 typically includes the application of an adhesive, such as liquid glue, between end area 32 and mating area 34, region 70 serves to retain excess adhesive between the various portions 66, 68, 70 of sealing member 42. Moreover, as the first frame member 16 is urged toward the second frame member 18 during assembly, sealing member 42 tends to dam region 70, causing any excess adhesive to be extruded endwise rather than onto inside 12 or outside 14 of closure 10. Thus the finished faces of inside 12 and outside 14 of closure 10 are not fouled with adhesive during assembly and disruption from time consuming adhesive clean-up is avoided. Moreover, sealing member 42 is virtually imperceptible in assembled joint 30.

Figure 4:
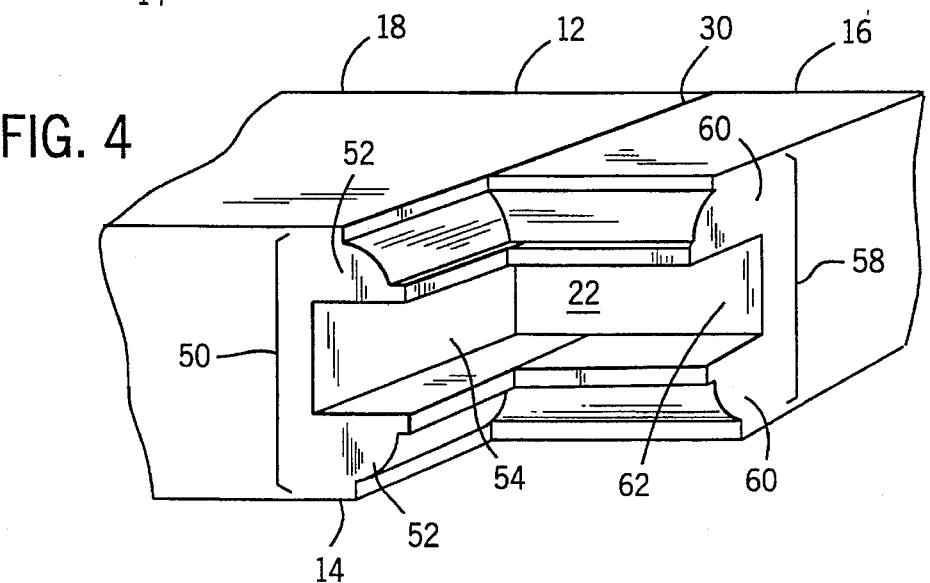
FIG. 4 is a perspective view of the inside corner illustrated in FIG. 3 in a door of the type illustrated in FIG. 1 with the panel removed to show the channel formed by the profiled edges of the stile and rail.

FIG. 4 is a perspective view of the inside corner illustrated in FIG. 3 in a door of the type illustrated in FIG. 1 with the panel removed to show the channel formed by the profiled edges of the stile and rail. In FIG. 4, profiled edge 50 of second frame member 18 and profiled edge 58 of first frame member 16 cooperate to effectively surround central aperture 22 with an integral cope 52, 60 both on the inside 12 and the outside 14 of closure 10. Between these integral copes 52, 60, profiled edges 50 and 58 present a continuous central groove 54, 62 suitable for retaining panel member 24.

Figure 5:
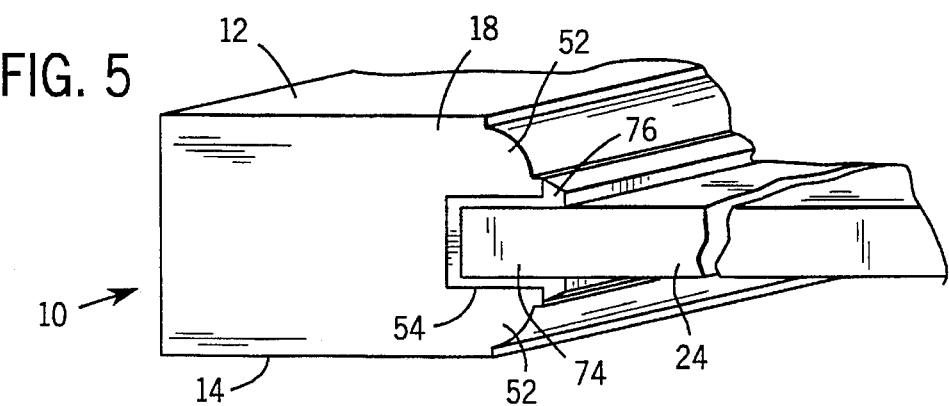
FIG. 5 is a partial sectioned perspective view along section 5—5 in FIG. 1, showing a typical sealing arrangement for the panel.

FIG. 5 is a partial sectioned perspective view along section 5—5 in FIG. 1, showing a typical sealing arrangement for the panel. In FIG. 5, panel member 24 may, for example, include a single or multiple-piece wooden panel (such as in a six-panel door), or a single or multiple-piece glass assembly (such as in a window unit or French door). Panel member 24 includes a periphery 74 that is inserted in a sealing boot 76 that completely surrounds panel member 24. Sealing boot 76 is typically molded from a resilient material such as synthetic rubber. As closure 10 is assembled, panel member 24 is positioned so that periphery 74 and sealing boot 76 will enter into central grooves 54, 62 of frame members 18 and 16 respectively. Integral copes 52 and 60 retain panel member 24 and compress sealing boot 76 sufficiently to establish a weather-resistant seal between sealing boot 76 and periphery 74.

The fabrication of closure 10 preferably proceeds as follows. First frame members 16, 17 and second frame members 18, 19 are positioned alternately to define a substantially planar frame 20 having a central aperture 22. At this stage frame 20 is loosely defined such that panel member 24, may be positioned within aperture 22. Where bores 44, 46 are provided in the first and second frame members 16, 17, 18, 19, these bores are aligned such that corresponding bores 44, 46 are in mutually facing substantially registered relation as previously discussed and connecting members 48 are positioned intermediate the mutually facing bores. Where closure 10 is to include sealing members 42, these sealing members 42 are positioned between end areas 32 and mating areas 34. Adhesive is applied intermediate each first frame member 16, 17 and the adjacent second frame member 18, 19, and the frame members are urged toward one another to engage the panel member 24 in central groove 54, 62 and to establish joints 30. The entire closure 10 is then compressed peripherally to abut each first frame member with the adjacent second frame member and establish a unified structure.

While the invention is susceptible to various modifications and alternative forms, specific embodiments have been shown by way of example in the drawings and were described in detail herein. However, it should be understood that the invention is not intended to be limited to the particular forms disclosed. Rather, the invention is to cover all modifications, equivalents and alternatives falling within the spirit and scope of the invention as defined by the appended claims.

We claim:

1. A closure frame comprising:
a first elongated wood member having a generally solid cross-section bounded by at least a first side;
a second elongated wood member having a generally solid cross-section and terminating at a first end being joined to the first side to form an interface therebetween; and
a sheet of resilient material located within the interface to form a weather-tight barrier at said interface.

2. A closure frame comprising:
a first elongated wood member having a generally solid cross-section bounded by at least a first side;
a second elongated wood member having a generally solid cross-section and terminating at a first end being joined to the first side to form an interface therebetween; and
a sealing member located within the interface to form a weather-tight barrier at said interface;
wherein the cross-section of the second elongated wood member has a height and a width, and wherein said sealing member includes a first portion and a second portion, said first portion substantially spanning said height, said second portion abutting said first portion and substantially spanning said width.

3. A closure as recited in claim 1 or 2 wherein the wood members are solid wood.

4. A closure having an inside and an outside comprising: a wood rail and a wood stile each having a generally solid cross-section, said rail having an end butting said stile to establish a boundary area intermediate said inside and said outside; and a sheet of resilient material disposed intermediate said inside and said outside at said boundary area to preclude the passage of fluid across said boundary.

5. A closure having an inside and an outside comprising: a wood rail and a wood stile each having a generally solid cross-section, said rail having an end abutting said stile to establish a boundary area intermediate said inside and said outside; and a sealing member disposed intermediate said inside and said outside at said boundary area to preclude the passage of fluid across said boundary; wherein said boundary area has a height and a width, said width extending from said inside to said outside, and wherein said sealing member includes a first portion and a second portion, said first portion substantially spanning said height, said second portion abutting said first portion and substantially spanning said width.

6. A closure having an inside and an outside comprising: a wood rail and a wood stile each having a generally solid cross-section, said rail having an end abutting said stile to establish a boundary area intermediate said inside and said outside; and a sealing member disposed intermediate said inside and said outside at said boundary area to preclude the passage of fluid across said boundary; wherein said boundary area has a height and a width, said width extending from said inside to said outside, and wherein said sealing member includes a first portion, a second portion and a third portion, said first portion substantially spanning said height substantially adjacent to said inside, said second portion abutting said first portion and substantially spanning said width, and said third portion abutting said second portion and substantially spanning said height substantially adjacent to said outside, an adhesive reservoir region being formed at said interface by said first portion, said second portion and said third portion.

7. A sealed closure, said closure having an inside and an outside; said closure comprising a plurality of first frame members, a plurality of second frame members, a plurality of sealing members, and a panel member; said plurality of first frame members and said plurality of second frame members meeting at a plurality of joints to define a substantially planar frame presenting a central aperture; said panel member being peripherally and sealingly retained in said central aperture by said plurality of first frame members and said plurality of second frame members; at each respective joint of said plurality of joints a first frame member of said plurality of first frame members substantially conformingly abutting a second frame member of said plurality of second frame members to define an interface and to establish a via intermediate said inside and said outside; at each said respective joint a respective sealing member of said plurality of sealing members at least partially coveting said interface to block said via appropriately to establish a weather-tight barrier at said interface, wherein at each said respective joint said respective sealing member is substantially coextensive with said interface.

8. A sealed closure as recited in claim 7 wherein at each said respective joint said interface has a height and a width, said width extending from said inside to said outside, and wherein said respective sealing member includes a first portion and a second portion, said first portion substantially spanning said height, said second portion abutting said first portion and substantially spanning said width.

9. A sealed closure as recited in claim 7 wherein at each said respective joint said interface has a height and a width, said width extending from said inside to said outside, and wherein said sealing member includes a first portion, a second portion and a third portion, said first portion substantially spanning said height substantially adjacent to said inside, said second portion abutting said first portion and substantially spanning said width, and said third portion abutting said second portion and substantially spanning said height substantially adjacent to said outside, an adhesive reservoir region being formed at said interface by said first portion, said second portion and said third portion.

10. A sealed closure as recited in claim 7 wherein each respective first frame member of said plurality of first frame members and each respective second frame member of said plurality of second frame members has a profiled edge including a cope, and wherein said profiled edges of each said respective first frame member and each said respective second frame member are oriented toward said aperture in said frame appropriately to substantially surround said aperture with said cope.

11. A sealed closure as recited in claim 10 wherein said panel member is nestingly retained in said frame by said cope.

12. A closure, said closure having a unified structure presenting an inside and an outside; said closure comprising a plurality of first frame members, a plurality of second frame members, and a panel member; each respective first frame member of said plurality of first frame members and each respective second frame member of said plurality of second frame members having a profiled edge including an integral cope; each respective first frame member having first and second ends appropriately profiled to copingly fit said profiled edge of an adjacent said respective second frame member; said plurality of first frame member and plurality of second frame members meeting at a plurality of joints to define a substantially planar frame presenting a central aperture; said profiled edge of each said respective first frame member and each said respective second frame member being oriented toward said central aperture appropriately to surround said central aperture with said integral cope; said panel member being peripherally retained in said central aperture by said integral cope; at each respective joint of said plurality of joints an end of a respective first frame member substantially copingly abutting a portion of said profiled edge of a respective second frame member; said plurality of first frame members, said plurality of second frame members, said joints and said panel member cooperating to establish said unified structure wherein said closure further comprises a plurality of sealing members, and wherein at each said respective joint a respective first frame member and a respective second frame member meet to define an interface and establish a via intermediate aid inside and said outside, and wherein at each said respective joint a respective sealing member of said plurality of sealing members at least partially covers said interface to block said via appropriately to establish a weather-tight barrier at said interface, and at each joint of said plurality of joints said sealing member and said interface are substantially coextensive.

13. A closure as recited in claim 12 wherein at each said respective joint said interface has a height and a width, said width extending from said inside to said outside, and said sealing member includes a first portion and a second portion, said first portion substantially spanning said height, said second portion abutting said first portion and substantially spanning said width.

14. A closure as recited in claim 12 wherein at each said respective joint said interface has a height and a width, said width extending from said inside to said outside, and wherein said sealing member includes a first portion, a second portion and a third portion, said first portion substantially spanning said height substantially adjacent to said inside, said second portion abutting said first portion and substantially spanning said width, and said third portion abutting said second portion and substantially spanning said height substantially adjacent to said outside; an adhesive reservoir region being formed at said interface by said first portion, said second portion and said third portion.

15. A method for fabricating a closure, said closure having an inside and an outside, the method comprising the steps of:

(a) positioning a plurality of first frame members and a plurality of second frame members alternately to define a substantially planar frame having a central aperture;

(b) positioning a panel member within said aperture;

(c) urging said plurality of first frame members and said plurality of second frame members toward one another to engage said panel member and to establish a plurality of joints, each respective joint of said plurality of joints being established intermediate a respective first frame member of said plurality of first frame members and a respective second frame member of said plurality of second frame members;

(d) urging a respective first frame member and a respective second frame member toward one another to define an interface and to establish a via intermediate said inside and said outside;

(e) providing a sealing member at each said respective joint, said sealing member substantially coextensive with said interface to block said via appropriately to establish a weather-tight barrier at said interface; and (f) compressively abutting said plurality of first frame members and said plurality of second frame members to establish a unified structure.

16. A method for fabricating a closure as recited in claim 15 wherein each said respective first frame member and each said second frame member presents a profiled edge including a cope, and each said respective first frame member has a first end and a second end appropriately profiled to copingly fit said profiled edge of an adjacent respective second frame member; and wherein at step (a) said first end and said second end of each said respective first frame member are positioned in mutually facing relation with a respective portion of said profiled edge of a respective second frame member.

17. A method for fabricating a closure as recited in claim 16 wherein a first bore is provided in each said end of each said respective first frame member, and a second bore is provided in said profiled edges of each said respective second frame member, each said first bore being appropriately located to lie in mutually facing substantially registered relationship with a respective said second bore when said plurality of first frame members and said plurality of second frame members are arranged to define said frame in step (a); and wherein said method further includes, prior to step (a), the step of positioning a connecting member intermediate each said respective first bore and each said respective second bore in said mutually facing substantially registered relationship, each said connecting members being received within said respective first bore and said respective second bore in said mutually facing relationship during step (c).

18. A method of fabricating a closure as recited in claim 15 including, prior to step (d), the further step of applying an adhesive intermediate each respective first frame member and each respective second frame member at each respective joint.

19. A closure having an inside and an outside, the closure comprising:

a first member having an end area extending intermediate the inside and the outside;

a second member having a mating area suitably configured to conformingly abut the end area to define an interface and to establish a via intermediate the inside and outside; and a sealing member, wherein the interface has a height and a width, the width extending from the inside to the outside, and wherein the sealing member includes a first portion, a second portion and a third portion, the first portion substantially spanning the height substantially adjacent to the inside, the second portion abutting the first portion and substantially spanning the width, and the third portion abutting the second portion and substantially spanning the height substantially adjacent to the outside, and adhesive reservoir region being formed at the interface by the first portion, the second portion and the third portion.

20. A closure having an inside and an outside, the closure comprising:

a rail and a stile, the rail having an end abutting the stile to establish a boundary area intermediate the inside and the outside; and a sealing member disposed intermediate the inside and the outside at the boundary area, wherein the boundary area has a height and a width, the width extending from the inside to the outside, and wherein the sealing member includes a first portion, a second portion and a third portion, the first portion substantially spanning the height substantially adjacent to the inside, the second portion abutting the first portion and substantially spanning the width, and the third portion abutting the second portion and substantially spanning the height substantially adjacent to the outside, an adhesive reservoir region being formed at the interface by the first portion, the second portion and the third portion.

* * * * *